US012521984B2

(12) United States Patent
Takamura et al.

(10) Patent No.: US 12,521,984 B2
(45) Date of Patent: Jan. 13, 2026

(54) LIQUID EJECTION HEAD, LIQUID EJECTION DEVICE, AND INKJET PRINTER

(71) Applicant: RISO Technologies Corporation, Tokyo (JP)

(72) Inventors: Jun Takamura, Mishima Shizuoka (JP); Takanori Gomi, Numazu Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 57 days.

(21) Appl. No.: 18/509,238

(22) Filed: Nov. 14, 2023

(65) Prior Publication Data

US 2024/0262102 A1 Aug. 8, 2024

(30) Foreign Application Priority Data

Feb. 8, 2023 (JP) ................................ 2023-017854

(51) Int. Cl.
*B41J 2/045* (2006.01)
*B41J 11/00* (2006.01)

(52) U.S. Cl.
CPC ....... *B41J 2/04588* (2013.01); *B41J 2/04581* (2013.01); *B41J 11/007* (2013.01)

(58) Field of Classification Search
CPC .. B41J 2/04573; B41J 2/04588; B41J 2/0457; B41J 2/04581
See application file for complete search history.

(56) References Cited

U.S. PATENT DOCUMENTS

| | | | | |
|---|---|---|---|---|
| 8,752,925 | B2 | 6/2014 | Norigoe | |
| 9,630,402 | B2 | 4/2017 | Kimura | |
| 2017/0008280 | A1 * | 1/2017 | Nitta | B41J 2/04596 |
| 2022/0184943 | A1 | 6/2022 | Wong et al. | |

FOREIGN PATENT DOCUMENTS

| | | | | |
|---|---|---|---|---|
| EP | 3388240 | A1 * | 10/2018 | B41J 2/04595 |
| EP | 3508344 | A1 | 7/2019 | |

OTHER PUBLICATIONS

Extended European Search Report mailed May 15, 2024 in corresponding European Patent Application No. 23215774.3, 9 pages.

* cited by examiner

*Primary Examiner* — Scott A Richmond
(74) *Attorney, Agent, or Firm* — Kim & Stewart LLP

(57) ABSTRACT

A liquid ejection head includes a nozzle plate including a nozzle that ejects a liquid, a pressure chamber communicating with the nozzle, an actuator changing a volume of the chamber according to a signal, and a drive circuit issuing the signal that includes: one or more first ejection waveforms each including a first expansion pulse and a first contraction pulse at a first time after the first pulse, and a second ejection waveform including a second expansion pulse and a second contraction pulse at a second time after the second pulse, the second time being longer than the first time, and one or more of first to (n−1)-th drops are ejected by the first waveforms, and an n-th drop is ejected by the second waveform where n is a number of drops ejected for one pixel.

16 Claims, 8 Drawing Sheets

<EXAMPLE 1>

<COMPARATIVE EXAMPLE 1>

<COMPARATIVE EXAMPLE 2>

LIQUID EJECTION HEAD, LIQUID EJECTION DEVICE, AND INKJET PRINTER

CROSS-REFERENCE TO RELATED APPLICATION

This application is based upon and claims the benefit of priority from Japanese Patent Application No. 2023-017854, filed on Feb. 8, 2023, the entire contents of which are incorporated herein by reference.

FIELD

Embodiments described herein relate generally to a liquid ejection head, a liquid ejection device, and an inkjet printer.

BACKGROUND

An inkjet head mounted on an inkjet printer is known as one type of a liquid ejection device. An inkjet printer ejects ink droplets from an inkjet head to form an image or the like on the surface of a recording medium. The inkjet head ejects ink droplets from nozzles by changing the volume of the pressure chambers connected to the pressure chambers using a piezoelectric actuator. The operation of the actuator is controlled by a drive waveform input to the actuator.

Immediately after being ejected, an ink droplet may still be connected to the ink in the nozzle and thus forms a tail or liquid column. Then, if the tail portion breaks, droplets other than the intended ejected droplet may be formed. The droplets formed by the collapse of liquid columns are called satellite mist. Since the satellite mist decreases print quality due to landing disturbance, the timing of contraction pulses may be delayed to reduce the amount of the satellite mist. On the other hand, in a case where ink is being ejected nearly continuously for a multi-drop method for gradation printing, the amount of satellite mist can be reduced by delaying the contraction pluses, but the landing accuracy deteriorates.

DETAILED DESCRIPTION

Embodiments provide a liquid ejection head and a liquid ejection device capable of providing landing accuracy while reducing satellite mist during ejection.

In general, according to one embodiment, a liquid ejection head comprises a nozzle plate including a nozzle that ejects a liquid, a pressure chamber that communicates with the nozzle, an actuator configured to change a volume of the pressure chamber according to a driving signal, and a drive circuit configured to issue the driving signal. The driving signal includes: one or more first ejection waveforms each including a first expansion pulse for expanding the pressure chamber and a first contraction pulse for contracting the pressure chamber at a first predetermined time after the first expansion pulse, and a second ejection waveform including a second expansion pulse for expanding the pressure chamber and a second contraction pulse for contracting the pressure chamber at a second predetermined time after the second expansion pulse. The second predetermined time is longer than the first predetermined time, and one or more of first to (n−1)-th drops of the liquid are ejected by the first ejection waveforms, and an n-th drop of the liquid is ejected by the second ejection waveform where n is a number of drops of the liquid ejected for one pixel.

Figure 1:
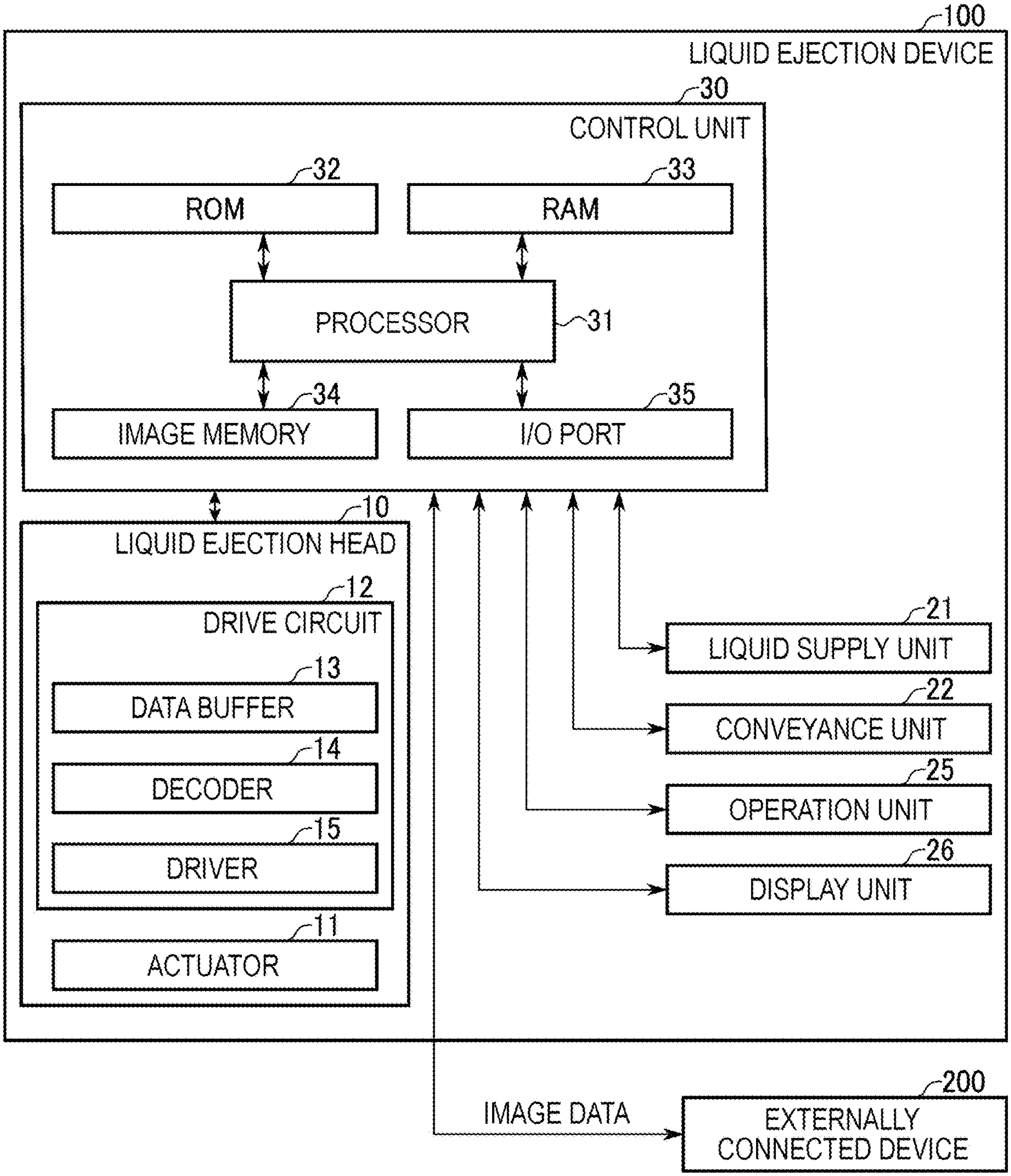
FIG. 1 is an explanatory diagram illustrating a configuration of a liquid ejection device according to a first embodiment.
Figure 2:
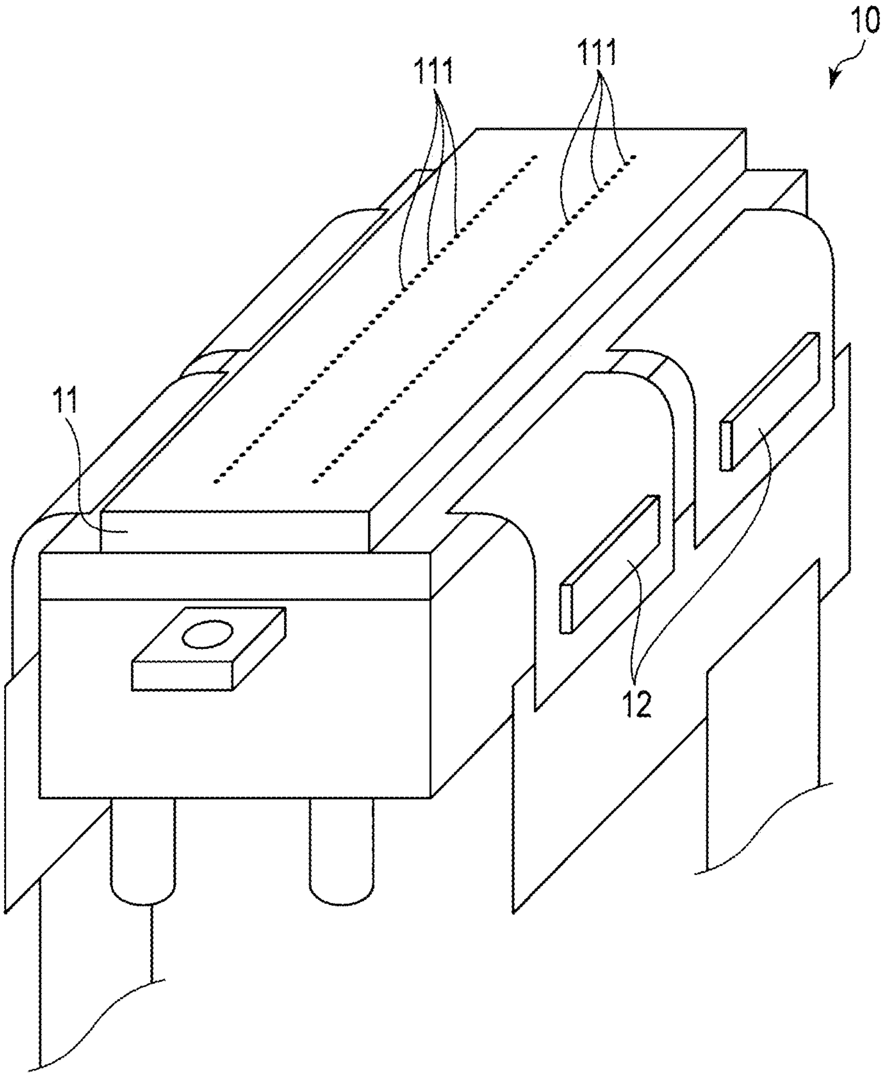
FIG. 2 is a perspective view illustrating a configuration of a liquid ejection head.
Figure 3:
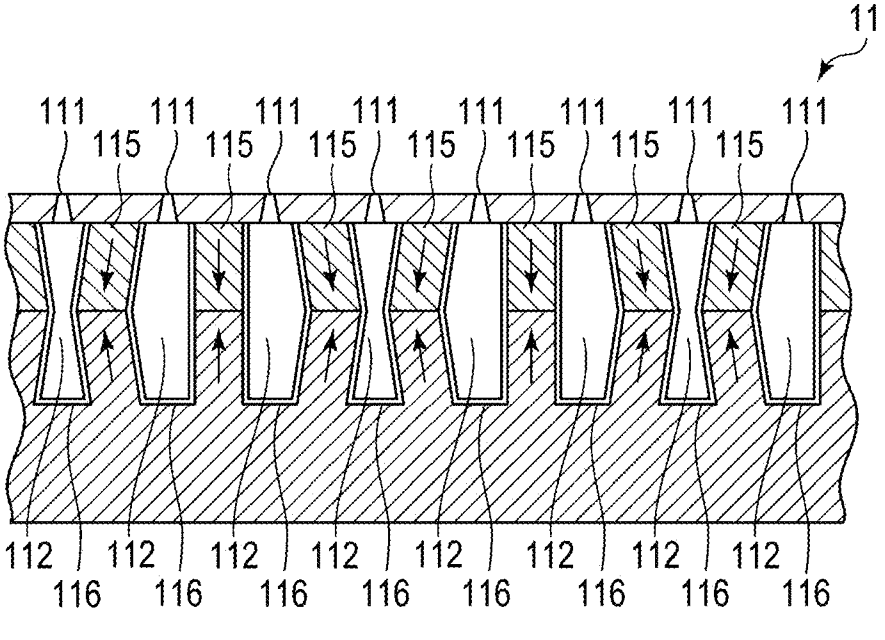
FIG. 3 is a cross-sectional view illustrating a part of the liquid ejection head.

A liquid ejection head 10 and a liquid ejection device 100 according to a first embodiment will be described below with reference to FIGS. 1 to 10. FIG. 1 is a block diagram illustrating a configuration of the liquid ejection device 100 according to the first embodiment. FIG. 2 is a perspective view illustrating the configuration of the liquid ejection head 10, and FIG. 3 is a cross-sectional view illustrating a configuration of an actuator 11 of the liquid ejection head 10.

As illustrated in FIG. 1, the liquid ejection device 100 includes the liquid ejection head 10, a liquid supply unit 21, a conveyance unit 22, an operation unit 25, a display unit 26, and a control unit 30.

Figure 10:
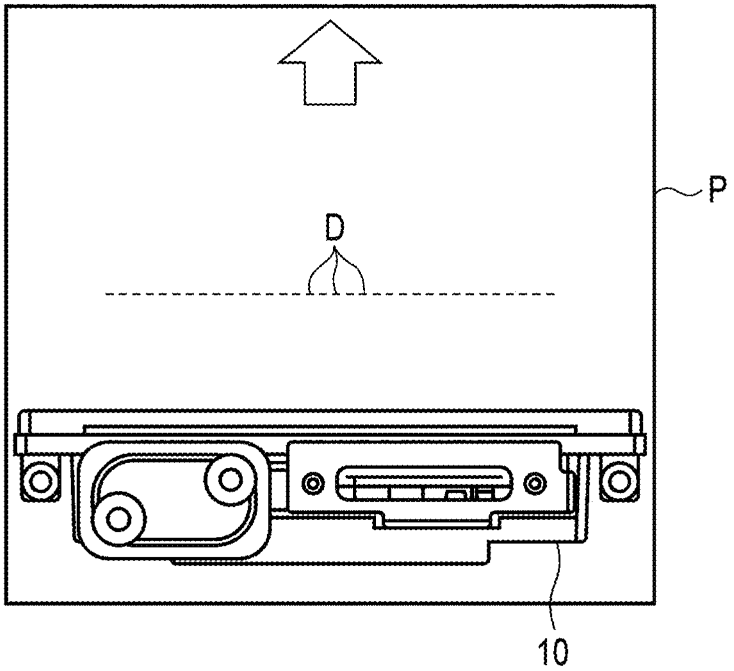
FIG. 10 is an explanatory diagram illustrating printing characteristics of Example 1, and Comparative Examples 1 and 2.

As illustrated in FIG. 10, the liquid ejection device 100 is an image forming apparatus such as an inkjet printer that performs an image forming process on a medium P such as paper by ejecting liquid such as ink from the liquid ejection head 10 while conveying the medium P, which is an ejection target, along a predetermined conveyance path passing through a printing position facing the liquid ejection head 10.

The liquid ejection head 10 is, for example, a share mode shared wall type inkjet head. The liquid ejection head 10 may be a non-circulating head that does not circulate ink, or a circulating head that circulates ink. In the present embodiment, the liquid ejection head 10 will be described using an example of a non-circulating head.

For example, the liquid ejection head 10 includes the actuator 11 including a plurality of piezoelectric elements 115 communicating with nozzles 111, and a drive circuit 12 that drives the actuator 11.

For example, the liquid ejection head 10 has a flow path including a plurality of nozzles 111 for ejecting liquid, a plurality of pressure chambers 112 communicating with the nozzles 111, and a common chamber communicating with the plurality of pressure chambers 112. The flow path of the liquid ejection head 10 is connected to the liquid supply unit 21, and ink is supplied from the liquid supply unit to the flow path of the liquid ejection head 10.

The actuator 11 is, for example, an actuator plate made of a piezoelectric member in a plate shape, and includes a plurality of piezoelectric elements 115 and electrodes 116 formed on the piezoelectric elements 115. For example, each of groove-shaped pressure chambers 112 is formed between two of the piezoelectric elements 115 that are adjacent to each other. In the actuator 11, a voltage is applied to the electrodes 116 of the piezoelectric elements 115 provided corresponding to each of the pressure chambers 112 to deform the piezoelectric elements 115, thereby increasing or decreasing the volume of the pressure chambers 112 and ejecting ink from the nozzles 111.

The drive circuit 12 drives the actuator 11 by applying a drive voltage to the piezoelectric electrodes. The drive circuit 12 generates control signals and drive signals for operating the piezoelectric element 115. The drive circuit 12 generates a control signal for controlling the timing of ejecting the liquid and the selection of the piezoelectric element 115 for ejecting the liquid, according to an image signal input from the control unit 30 of the liquid ejection device 100. The drive circuit 12 also generates a voltage to be applied to the electrodes 116 of the piezoelectric element 115, that is, a drive signal according to the control signal. If the drive circuit 12 applies a drive signal to a piezoelectric element 115, the piezoelectric element 115 is driven to change the volume of the pressure chamber 112. That is, the actuator 11 is controlled by the control unit 30.

As illustrated in FIG. 1, the drive circuit 12 includes a data buffer 13, a decoder 14, and a driver 15. The data buffer 13 stores print data for each piezoelectric element 115 of the actuator 11 in time series. The decoder 14 controls the driver 15 based on the print data stored in the data buffer 13 for each piezoelectric element 115. The driver 15 outputs a drive signal for operating each piezoelectric element 115 under the control of the decoder 14. A drive signal is a voltage applied to the electrode 116 of each piezoelectric element 115.

The liquid supply unit 21 is connected to the primary side of the flow path of the liquid ejection head 10 and supplies liquid to the flow path of the liquid ejection head 10. For example, the liquid supply unit 21 includes a tank that stores liquid, a connection flow path that connects the tank and the flow path of the liquid ejection head 10, and a liquid transfer pump that sends the liquid in the tank to the liquid ejection head 10.

The conveyance unit 22 conveys a medium P such as paper along a predetermined conveyance path and supplies the medium to a printing position. The conveyance unit 22 includes, for example, a plurality of conveyance rollers or conveyance guides arranged along the conveyance path. The conveyance unit 22 holds the medium P to be movable relative to the liquid ejection head 10.

The operation unit 25 includes function keys such as a power key, a paper feed key, and an error cancel key.

The display unit 26 includes a display capable of displaying various states of the liquid ejection device 100 (e.g., an image forming apparatus).

The control unit 30 is, for example, a control board or controller, and includes a processor 31, a read only memory (ROM) 32, a random access memory (RAM) 33, an image memory 34, and an I/O port 35 as an input/output port.

The processor 31 is a processing circuit such as a central processing unit (CPU). The processor 31 corresponds to a core component of the control unit 30. The processor 31 controls each unit to perform various functions as the liquid ejection device 100 according to an operating system and one or more application programs. For example, the processor 31 controls operations of the liquid ejection head 10, the liquid supply unit s21, and the conveyance unit 22 provided in the liquid ejection device 100. The processor 31 transmits the print data stored in the image memory 34 to the drive circuit 12 in the drawing order at the time of printing.

The ROM 32 corresponds to a read-only memory of the controller 30. The ROM 32 stores one or more of the above operating system and application programs. The ROM 32 may store data necessary for the processor 31 to execute processing for controlling each unit.

The RAM 33 corresponds to a rewritable memory of the controller 30. The RAM 33 stores data necessary for the processor 31 to execute processing. The RAM 33 is also used as a work area in which information is appropriately rewritten by the processor 31.

The image memory 34 stores print data received from an externally connected device 200, for example.

The I/O port 35 is an interface circuit that inputs data from the externally connected device 200 and outputs data to the outside. Print data from the externally connected device 200 is transmitted to the control unit 30 via the I/O port 35 and stored in the image memory 34.

In the liquid ejection device 100 configured as described above, the control unit 30 applies a drive voltage to the drive circuit 12 by inputting a signal to the liquid ejection head 10 to generate a potential difference in or apply a voltage to the plurality of piezoelectric elements 115 and selectively deform the piezoelectric element 115, thereby increasing or decreasing the volume of the pressure chamber 112 and ejecting liquid from the nozzle 111. For example, if the volume of the pressure chamber 112 is expanded or contracted during driving, pressure vibration is generated within the pressure chamber 112. Due to the pressure vibration, the pressure in the pressure chamber 112 increases, and ink droplets are ejected from the nozzle 111 communicating with the pressure chamber 112. For example, a driver IC applies a drive voltage to the electrodes of the pressure chambers 112 via the electrodes 116 according to a signal input from the control unit 30 to generate a potential difference in the plurality of piezoelectric elements 115 and selectively deform the piezoelectric elements 115, thereby changing the volume of the pressure chamber 112. For example, if a voltage serving as an expansion pulse is applied, the piezoelectric element 115 deforms, the volume of the corresponding pressure chamber 112 increases, the pressure decreases, and the ink in the common chamber flows into the pressure chamber 112. If the drive voltage of the opposite potential is applied to the electrode 116 of the piezoelectric element 115 while the volume of the pressure chamber 112 is increased, the piezoelectric element 115 is deformed, the volume of the pressure chamber 112 is decreased, and the pressure is increased. Therefore, the ink in the pressure chamber 112 is pressurized and ejected from the nozzle 111.

Drive waveforms of drive signals generated by the drive circuit 12 of the liquid ejection head 10 will be described with reference to FIGS. 4 to 8.

Figure 4:
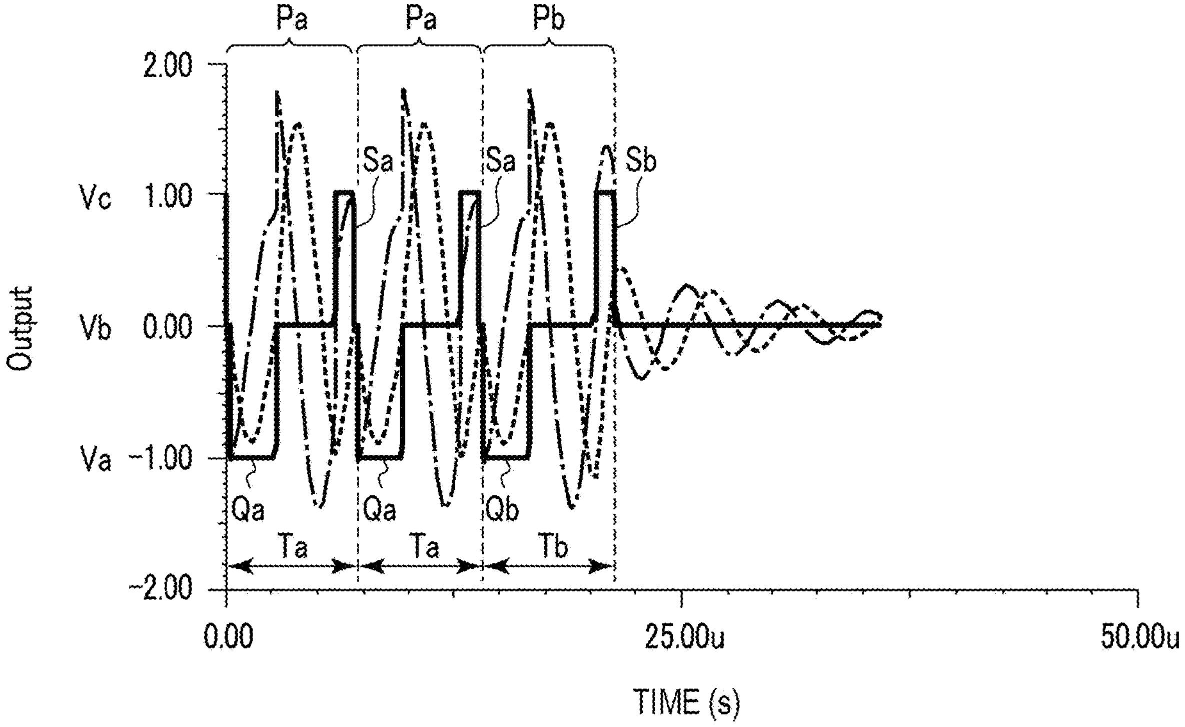
FIG. 4 is an explanatory diagram illustrating a drive waveform and a vibration analysis result of Example 1.
Figure 5:
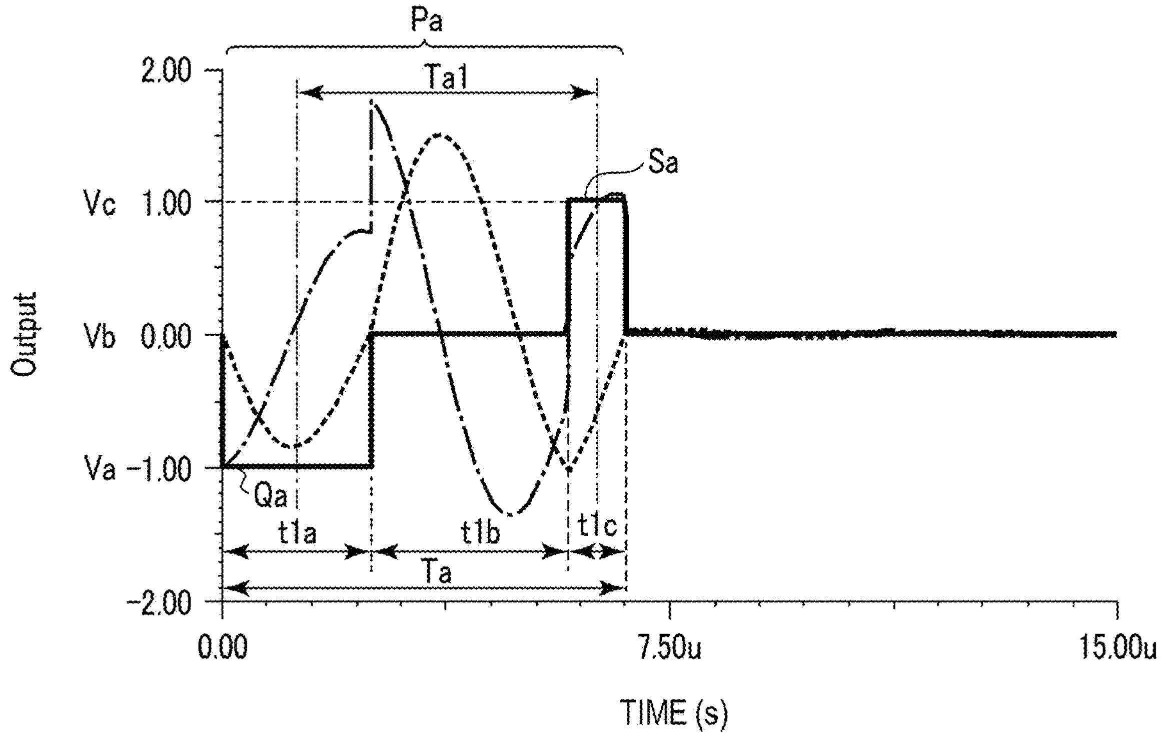
FIG. 5 is an explanatory diagram illustrating a first ejection waveform and a vibration analysis result in Example 1.
Figure 6:
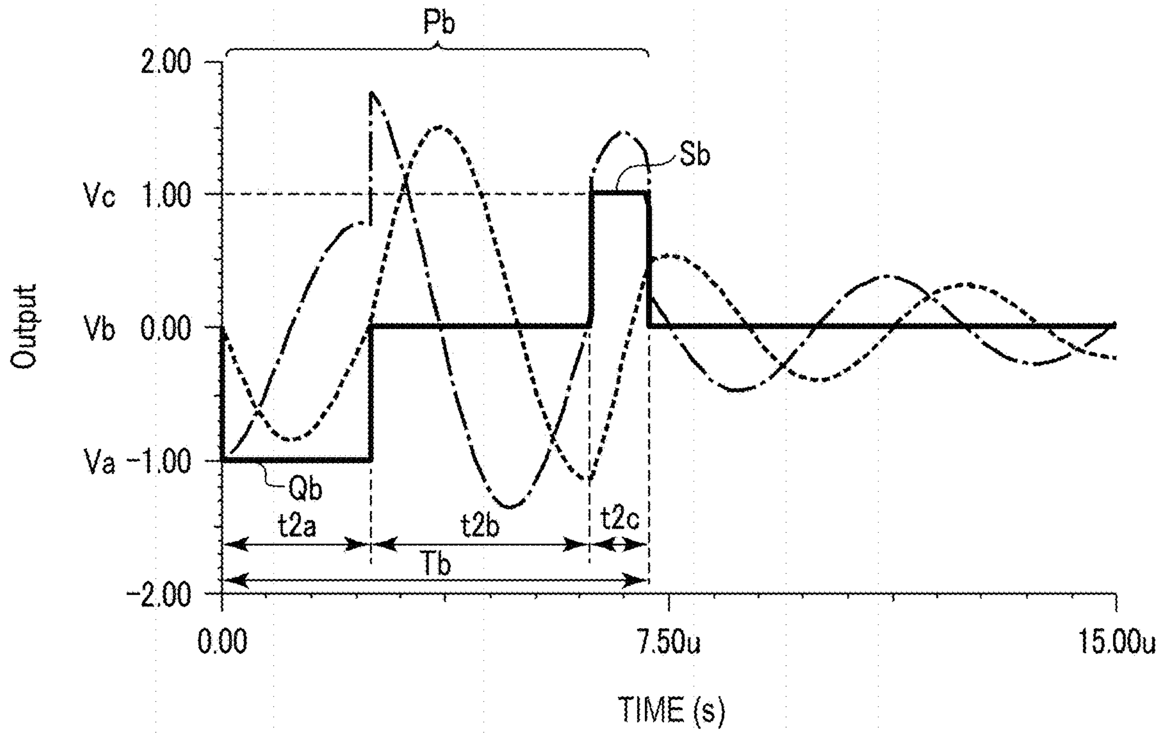
FIG. 6 is an explanatory diagram illustrating a second ejection waveform and a vibration analysis result in Example 1.
Figure 7:
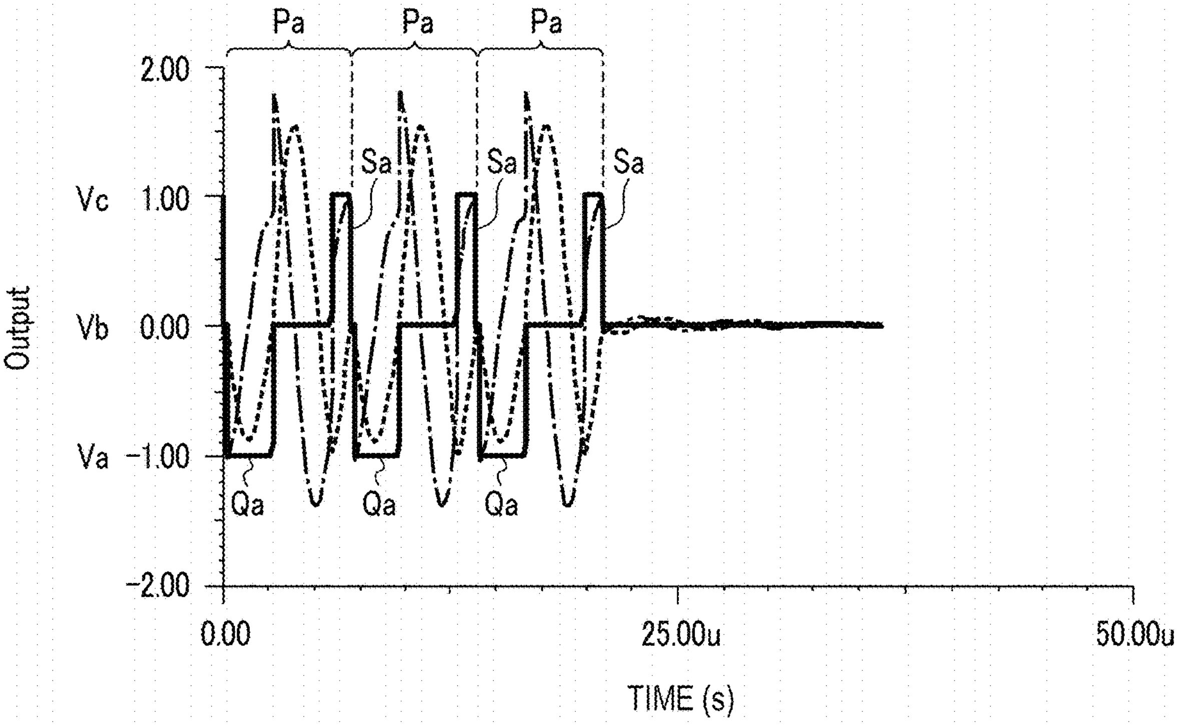
FIG. 7 is an explanatory diagram illustrating a drive waveform and a vibration analysis result of Comparative Example 1.
Figure 8:
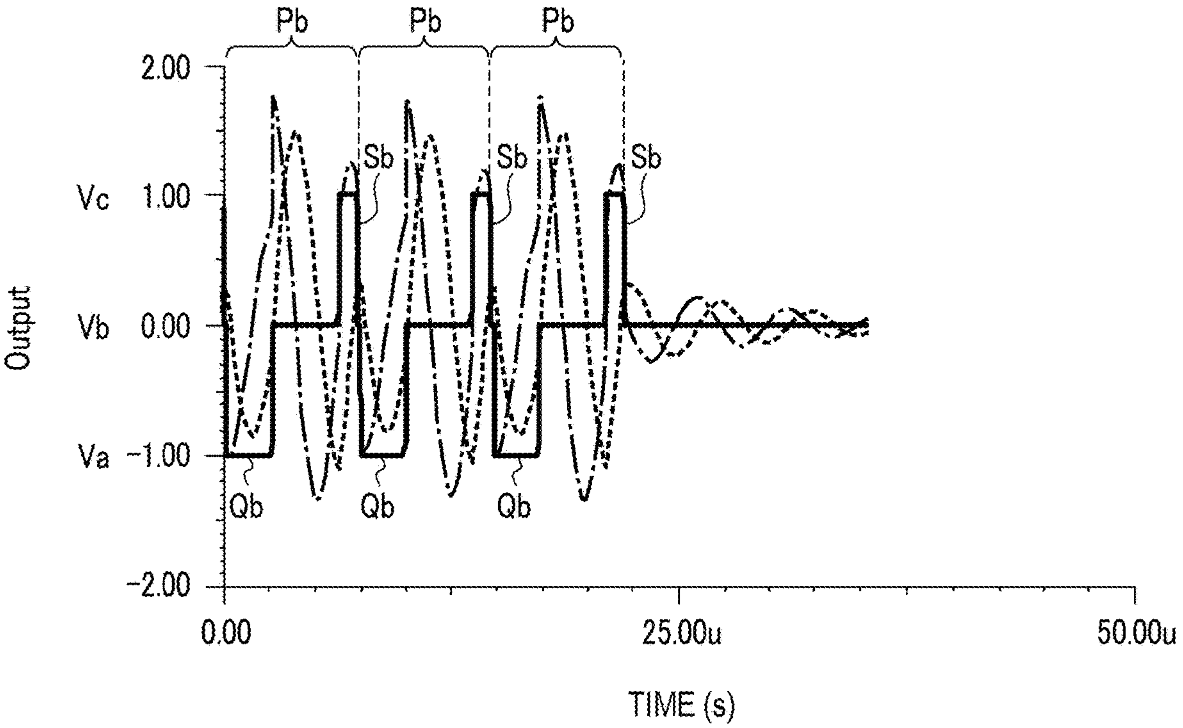
FIG. 8 is an explanatory diagram illustrating a drive waveform and a vibration analysis result of Comparative Example 2.
Figure 9A:
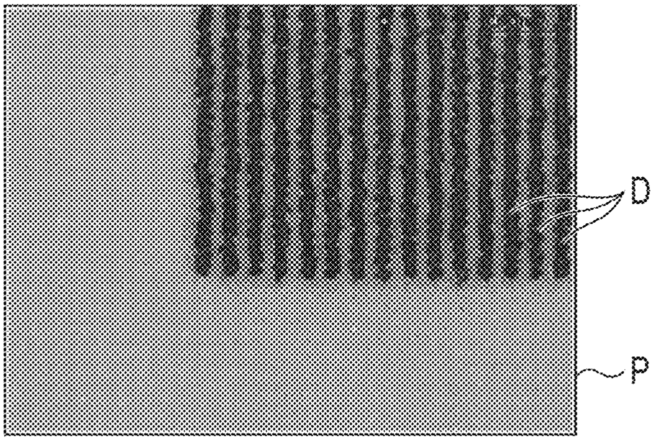
FIGS. 9A through 9C are explanatory diagrams of landing accuracy of the liquid ejection head.
Figure 9B:
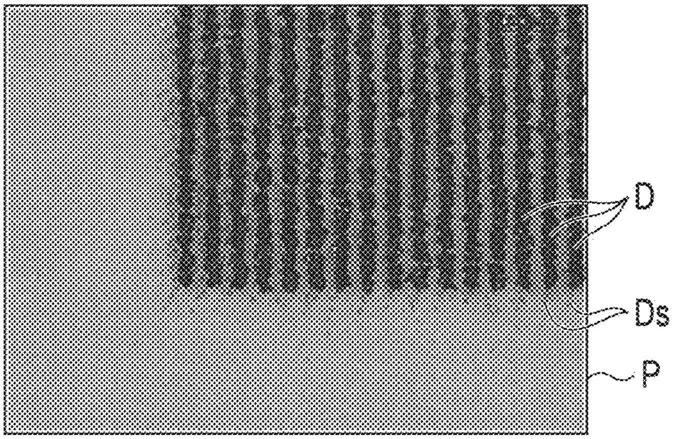
Figure 9C:
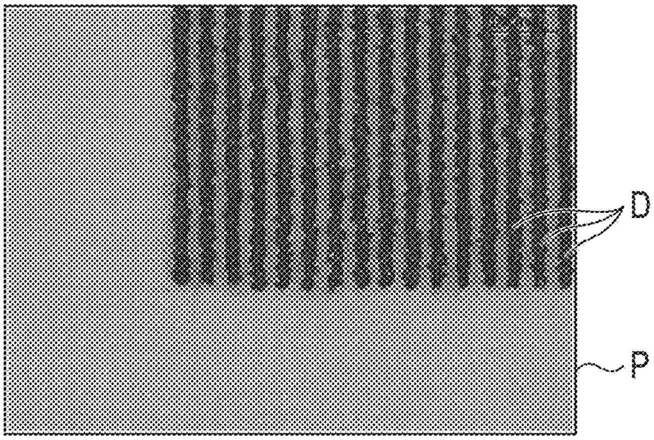
Figure 11:
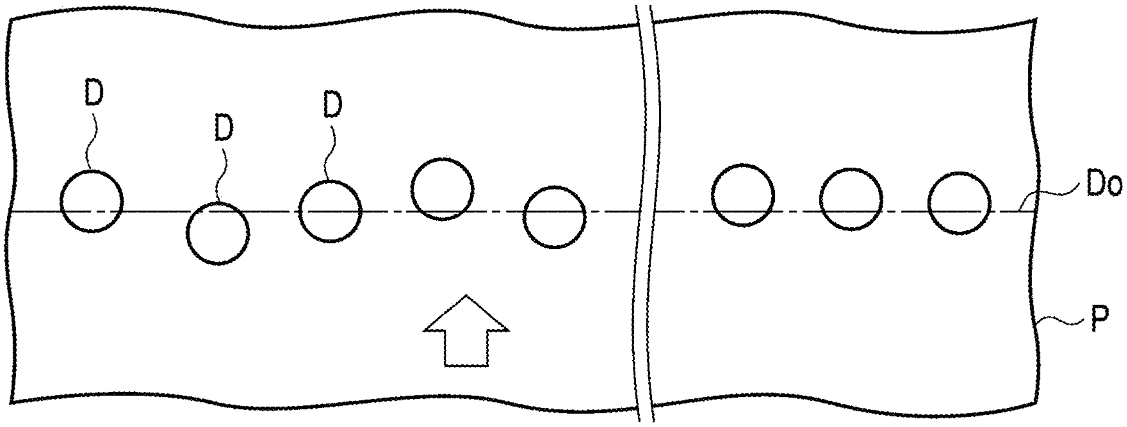
FIG. 11 is an explanatory diagram of printing operation of the liquid ejection head.

FIG. 4 illustrates a multi-drop waveform showing a drive waveform and a vibration analysis result of Example 1. FIG. 5 illustrates a first ejection waveform and a vibration analysis result, and FIG. 6 illustrates a second ejection waveform and a vibration analysis result. In each waveform diagram, the horizontal axis indicates time, and the vertical axis indicates voltage, ink flow velocity, and ink pressure. In each drawing, the voltage is indicated by a solid line, the flow velocity on the nozzle surface is indicated by a broken line, and the pressure on the nozzle is indicated by a one-dot chain line. FIG. 7 illustrates the drive waveform and the vibration analysis result of Comparative Example 1, and FIG. 8 illustrates the drive waveform and the vibration analysis result of Comparative Example 2. FIGS. 9A-9C are explanatory diagrams illustrating printing characteristics in Example 1, Comparative Example 1, and Comparative Example 2, respectively. FIGS. 10 and 11 are explanatory diagrams of printing operation and landing accuracy of the liquid ejection head 10.

FIG. 4 illustrates a drive waveform according to Example 1. The drive waveform of Example 1 illustrates an example of a multi-drop drive waveform that forms one dot by ejecting ink n times (n is an integer equal to or greater than 2) within one drive cycle. Waveform data of the drive waveform is stored in, for example, a memory in the drive circuit 12. Which drive waveform is to be input to the actuator 11 is selected by an IC of the drive circuit 12 based on the gradation data sent from the control board.

The drive waveform is multi-drop drive, and includes a plurality of times of ejection waveforms Pa and Pb. For example, Example 1 is a 3-drop waveform and has three ejection waveforms Pa, Pa, and Pb, each including expansion pulses Qa and Qb and contraction pulses Sa and Sb. Here, as an example, a multi-drop drive waveform in which the number of ejections in one driving cycle Ta is three drops (n=3) is illustrated, but the present disclosure is not limited thereto.

The drive waveforms illustrated in Example 1 are waveforms in which if one pixel is composed of a plurality of n drops (n>1), 1 to (n−1)th drops are ejected with the first ejection waveform Pa, and the n-th drop, which is the final drop, is ejected with the second ejection waveform Pb that reduces satellite mist more than the first ejection waveform Pa. That is, the drive waveform has the first ejection waveform Pa and the second ejection waveform Pb.

As illustrated in FIGS. 4 and 5, the first ejection waveform Pa includes a first expansion pulse Qa that expands the pressure chamber 112 and a first contraction pulse Sa that contracts the pressure chamber 112. In the first expansion pulse Qa, the voltage is lowered from a first voltage Vb, which is an intermediate voltage, to a second voltage Va, which is lower than the intermediate voltage, and the second voltage Va is continued for a predetermined time t1*a* before returning to the first voltage Vb. After the first voltage Vb is continued for a predetermined time t1*b*, a third voltage Vc higher than the first voltage Vb is applied as the first contraction pulse Sa for a predetermined time t1*c*, and returns to the first voltage Vb. The first ejection waveform Pa is a waveform in which ejection is performed with the expansion pulse Qa and vibration is reduced with the contraction pulse Sa. The first ejection waveform Pa has less residual vibration during ejection than the second ejection waveform Pb. In the drive waveform of Example 1, the first ejection waveform Pa as a reference is repeated n−1 times. The intermediate voltage is 0 V, for example, and is also called a reference voltage.

In the present embodiment, the first ejection waveform Pa is set such that the width t1*a* of the expansion pulse Qa is longer than the width t1*c* of the contraction pulse Sa, and the duration t1*b* of the intermediate voltage Vb is longer than the width t1*a* of the expansion pulse Qa.

For example, the width t1*a* of the expansion pulse Qa of the first ejection waveform Pa is the width of acoustic length (AL). If the contraction pulse Sa for reducing the vibration in the ejection operation is input at the timing if the interval (Ta1) between the half position in the Qa time direction and the half position of Sa in the time direction becomes 2AL, the vibration can be efficiently reduced. AL is a half period of the natural vibration period λ determined by the ink characteristics and the internal structure of the head.

As the ejection operation by the first ejection waveform Pa, if the second voltage Va is applied for the predetermined time t1*a* by the first expansion pulse Qa, an electric field is generated in the piezoelectric element 115 in a predetermined direction, and the piezoelectric element 115 is deformed. The deformation of the piezoelectric element 115 expands the volume of the pressure chamber 112, reducing the internal ink pressure, and a meniscus of the opening of the nozzle 111 is largely drawn toward the pressure chamber 112. Then, the ink pressure in the pressure chamber 112 (i.e., the ink chamber) starts to vibrate, and vibration occurs corresponding to the ink flow velocity with a phase shift of 90 degrees.

After expanding for AL time with the expansion pulse Qa, the pressure chamber 112 returns to its original shape if the voltage is returned to the first voltage Vb. Then, if the first voltage Vb is retained for a predetermined time t1*b*, the meniscus advances and ink ejection starts. After the first voltage Vb is retained for the predetermined time t1*b*, the contraction pulse voltage Vc is applied for the time t1*c*, which again deforms the piezoelectric element 115 of the actuator 11 to contract the volume of the pressure chamber 112 and increase the ink pressure, thereby reducing the vibration in pressure and flow velocity in the pressure chamber 112. By repeating the first ejection waveform Pa n−1 times, (n−1)-th ink droplets are ejected.

As illustrated in FIGS. 4 and 6, the second ejection waveform Pb includes a second expansion pulse Qb that expands the volume of the pressure chamber 112, and a second contraction pulse Sb that contracts the volume of the pressure chamber 112 after expansion. In the second expansion pulse Qb of the second ejection waveform Pb, the voltage is lowered from the first voltage Vb, which is the intermediate voltage, to the second voltage Va, which is lower than the intermediate voltage, and the second voltage Va is maintained for a predetermined time t2*a* before returning to the first voltage Vb. Then, after maintaining the first voltage Vb for t2*b* that is longer than the retaining time t1*b* of the first ejection waveform Pa, the third voltage Vc higher than the first voltage Vb is applied as the second contraction pulse Sb for a predetermined time t2*c*, and then the voltage returns to the first voltage Vb again.

In the present embodiment, the second ejection waveform Pb is set so that the width t2*a* of the expansion pulse Qb is longer than the width t2*c* of the contraction pulse Sb, and the duration t2*b* of the intermediate voltage Vb is longer than the width t2*a* of the expansion pulse Qb. Particularly, in the second ejection waveform Pb, the duration t2*b* of the intermediate voltage Vb is longer than the duration t1*b* of the intermediate voltage Vb of the first ejection waveform Pa. In other words, the second ejection waveform Pb means that the application timing of the contraction pulse is delayed compared to the first ejection waveform Pa. The period Tb of the second ejection waveform Pb is set longer than the period Ta of the first ejection waveform Pa.

That is, the second ejection waveform Pb is a waveform in which the application timing of the contraction pulse Sb is delayed with respect to the application timing of the contraction pulse Sa of the first waveform, and the time t2*b* until application of the contraction pulse after expansion is longer than the time t1*b* until the application of the contraction pulse after expansion of the first waveform. The second ejection waveform Pb is a waveform capable of reducing satellite mists during ejection compared to the first ejection waveform Pa. On the other hand, the second ejection waveform Pb has a larger residual vibration than the first ejection waveform Pa.

As the ejection operation by the second ejection waveform Pb, if the second expansion pulse Qb applies the second voltage Va for the predetermined time t2*a*, an electric field is generated in the piezoelectric element 115 in a predetermined direction, and the piezoelectric element 115 is deformed. The deformation of the piezoelectric element 115 expands the volume of the pressure chamber 112, reducing the internal ink pressure, and the meniscus of the opening of the nozzle 111 is largely drawn toward the pressure chamber 112. Then, the ink pressure in the pressure chamber 112 starts to vibrate, and vibration occurs corresponding to the ink flow velocity with a phase shift of 90 degrees.

Subsequently, if the voltage is returned to the first voltage Vb, the pressure chamber 112 returns to its original state, and the ink is ejected by increasing the ink pressure. Ink pressure drops due to ejection. Then, if the first voltage Vb is retained for the predetermined time t2*b*, the meniscus advances and ink ejection starts. After the first voltage Vb is retained for the predetermined time t2*b*, the contraction pulse voltage Vc is applied for the time t2*c* to deform the piezoelectric element 115 of the actuator 11 again to contract the volume of the pressure chamber 112 and increase the ink pressure, which leads to a decrease of residual vibration of the pressure and flow velocity in the pressure chamber 112 but remains larger than the residual vibration of the first ejection waveform Pa. The second ejection waveform Pb ejects the n-th ink droplet, which is the final drop. In the ejection operation of the final drop by the second ejection waveform Pb, the application timing of the contraction pulse is delayed from the first ejection waveform Pa of the first to (n−1)-th drops, so that the residual vibration of the ink in the pressure chamber 112 at the time of ejection remains from the first ejection waveform Pa, and the length of the tail of the ink droplet is shortened. Therefore, according to the second ejection waveform Pb, it is possible to reduce the satellite mist that is generated if the tail of the ink droplet is cut off and the ink droplet flies away from the nozzle 111.

FIG. 7 is an explanatory diagram illustrating a drive waveform and a vibration analysis result according to Comparative Example 1. The waveform of Comparative Example 1 is a waveform in which the first ejection waveform Pa in FIG. 5 is repeated three times. FIG. 8 is an explanatory diagram illustrating a drive waveform and a vibration analysis result according to Comparative Example 2. The waveform of Comparative Example 2 is a waveform in which the second ejection waveform Pb of FIG. 6 is repeated three times.

FIGS. 9A-9C are explanatory diagrams illustrating a printing state by the waveform of Example 1, the waveform of Comparative Example 1 in which the first ejection waveform for reducing residual vibration is repeated three times, and the waveform of Comparative Example 2 in which the second waveform for reducing satellite mist is repeated three times. According to FIGS. 9A-9C, satellite mist Ds, which is fine dots, is formed around dot D in Comparative Example 1, and it can be seen that the printing state according to the waveform of Example 1 can reduce satellite mist.

FIG. 10 is an explanatory diagram illustrating the liquid ejection head 10 and the medium P during the printing operation of the liquid ejection device 100. As illustrated in FIG. 10, in the liquid ejection device 100, if the liquid is ejected while the liquid ejection head 10 is moved relative to the medium P along the conveyance direction indicated by the arrow, as illustrated in FIG. 11, a plurality of dots D are formed on the medium P. Here, the printing conditions are G=1 mm, the number of drops per pixel=3 drops, the conveyance speed=528 mm/s, the print resolution in the transport direction)=300 dpi, and the ink is UV ink. As a result of measuring variation in linearity (e.g., standard deviation) of the dots D ejected from each of the nozzles 111 of one row of the liquid ejection head 10, the variation was 3.6 μm for the waveform of Comparative Example 1, in which the first ejection waveform with reduced residual vibration was repeated three times. In the waveform of Comparative Example 2, in which the second waveform with reduced satellite mist was repeated three times, the variation was 4.6 μm. On the other hand, the variation of the waveform of Example 1 was 2.6 μm. Therefore, the waveform of Example 1 improved the landing accuracy as compared with Comparative Examples 1 and 2. The variation in linearity was measured and calculated as the positive square root of the sum of the squares of the distances or differences between the average value Do and each dot D in the conveyance direction, divided by the number of dots D.

According to the liquid ejection head 10 and the liquid ejection device 100 according to the present embodiment, it is possible to ensure the landing accuracy while reducing the satellite mist. That is, in the case of n multi-drops, a plurality of waveforms are combined so that the drops up to the (n−1)-th drop have waveforms with little residual vibration, and the final n-th drop has a second waveform that reduces satellite mist, thereby both landing accuracy and reduction of satellite mist can be achieved. For example, as illustrated in FIGS. 9A-9C, it is possible to obtain a print result with little satellite mist and to reduce variations in landing positions.

Embodiments of the present disclosure are not limited to the configurations described above.

For example, as a waveform for reducing satellite mist, a waveform that delays the timing of the contraction pulse was exemplified, but the embodiments are not limited thereto. Alternatively, satellite mist can be reduced by a combination of adjusting a contraction pulse width and delaying the timing thereof.

For example, in the above embodiment, the drive waveform for ejecting 3 drops was described, but the embodiments are not limited thereto, and a drive waveform for ejecting 4 or more drops, for example, may be used.

An example was illustrated in which only the last one drop is set to the second ejection waveform, and the other first to (n−1)-th drops are ejected with the first ejection waveform, but the embodiments are not limited thereto. At least one or more of the first to (n−1)-th drops are ejected with the first ejection waveform, and the n-th drop needs be the drive waveform ejected with the second ejection waveform. For example, the last two drops may be the second waveform.

The value of the voltage applied to each piezoelectric element 115 can be appropriately adjusted according to various conditions. For example, a potential difference may be generated by grounding one of the adjacent piezoelectric elements 115 and applying a voltage to the other, or a potential difference may be generated applying a voltage to both of the piezoelectric elements 115 to generate a potential difference.

For example, the configuration of the liquid ejection head 10 is not limited to the above example, and other types of heads may be used. For example, the liquid ejection head 10 may be configured to drive the liquid ejection unit by vibrating a vibration plate provided between the pressure chamber 112 and a drive element unit by deformation of the drive element unit.

Each potential of the drive waveform can be changed as appropriate, and the voltage value applied to each piezoelectric element 115 can be adjusted as appropriate according to various conditions. For example, a potential difference may be generated by grounding one of the adjacent piezoelectric elements 115 and applying a voltage to the other, or a potential difference may be generated applying a voltage to both of the piezoelectric elements 115 to generate a potential difference.

The drive waveform is not limited to pull-hit, and may be a push-hit or push-pull-hit waveform.

For example, the configuration of the liquid ejection head 10 is not limited to the above example, and other types of heads may be used. For example, a structure that ejects ink by deforming a vibrating plate with static electricity, or a heating element type structure that ejects ink from a nozzle using thermal energy such as a heater may be used. Here, the vibrating plate, the heater, or the like serves as an actuator for applying pressure vibration to the inside of the pressure chamber 112.

The liquid ejection device 100 is illustrated as an inkjet printer that forms a two-dimensional image with ink on an image forming medium, but the embodiments are not limited thereto. For example, the liquid ejection device 100 is a 3D printer, industrial manufacturing machine, or medical machine where a material substance or a binder to solidify the material is ejected from an inkjet head to form a three-dimensional object.

According to at least one embodiment described above, it is possible to achieve both the landing accuracy and the reduction of satellite mist.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:
- a nozzle plate including a nozzle that ejects a liquid;
- a pressure chamber that communicates with the nozzle;
- an actuator configured to change a volume of the pressure chamber according to a driving signal; and
- a drive circuit configured to issue the driving signal, wherein
- the driving signal includes:
  - one or more first ejection waveforms each including a first expansion pulse for expanding the pressure chamber and a first contraction pulse for contracting the pressure chamber at a first predetermined time after the first expansion pulse, and
  - a second ejection waveform including a second expansion pulse for expanding the pressure chamber and a second contraction pulse for contracting the pressure chamber at a second predetermined time after the second expansion pulse, the second predetermined time being longer than the first predetermined time, and
- one or more of first to (n-1)-th drops of the liquid are ejected by the first ejection waveforms, and an n-th drop of the liquid is ejected by the second ejection waveform, where n is a number of drops of the liquid ejected for one pixel,
- the first and second expansion pulses apply a first voltage to the actuator,
- the first and second contraction pulses apply a second voltage higher than the first voltage to the actuator,
- the first expansion pulse applies the first voltage for a third predetermined time shorter than the first predetermined time,
- the first contraction pulse applies the second voltage for a fourth predetermined time shorter than the third predetermined time,
- the second expansion pulse applies the first voltage for a fifth predetermined time shorter than the second predetermined time, and
- the second contraction pulse applies the second voltage for a sixth predetermined time shorter than the fifth predetermined time.

2. The liquid ejection head according to claim 1, wherein a third voltage between the first and second voltages is applied to the actuator between the first expansion and contraction pulses for the first predetermined time and between the second expansion and contraction pulses for the second predetermined time.

3. The liquid ejection head according to claim 2, wherein a value of the first voltage is negative, a value of the second voltage is positive, and a value of the third voltage is 0.

4. The liquid ejection head according to claim 1, wherein each of the first ejection waveforms causes less residual vibration of the liquid in the pressure chamber than the second ejection waveform.

5. The liquid ejection head according to claim 1, wherein the first to (n-1)-th drops of the liquid are ejected by the first ejection waveforms, and the n-th drop is ejected by the second ejection waveform.

6. The liquid ejection head according to claim 1, wherein a time difference between a center of the first expansion pulse and a center of the first contraction pulse is equal to an acoustic length of the pressure chamber that stores the liquid, multiplied by two.

7. The liquid ejection head according to claim 1, wherein the liquid ejection head is of a share mode shared wall type.

8. The liquid ejection head according to claim 1, wherein the liquid is ink.

9. A liquid ejection device, comprising:
- a conveyer that conveys a medium to which a liquid is ejected;
- a liquid ejection head including:
  - a nozzle plate including a nozzle that ejects the liquid,
  - a pressure chamber that communicates with the nozzle,
  - an actuator configured to change a volume of the pressure chamber according to a driving signal, and
  - a drive circuit configured to issue the driving signal, wherein
  - the driving signal includes:
    - one or more first ejection waveforms each including a first expansion pulse for expanding the pressure chamber and a first contraction pulse for contracting the pressure chamber at a first predetermined time after the first expansion pulse, and
    - a second ejection waveform including a second expansion pulse for expanding the pressure chamber and a second contraction pulse for contracting the pressure chamber at a second predetermined time after the second expansion pulse, the second predetermined time being longer than the first predetermined time, and at least one of first to (n-1)-th drops of the liquid are ejected by the first ejection waveforms, and an n-th drop of the liquid is ejected by the second ejection waveform, where n is a number of drops of the liquid ejected to one pixel; and a controller configured to control the conveyer to convey the medium and the liquid ejection head to eject the liquid to the medium, wherein the first and second expansion pulses apply a first voltage to the actuator, the first and second contraction pulses apply a second voltage higher than the first voltage to the actuator, the first expansion pulse applies the first voltage for a third predetermined time shorter than the first predetermined time, the first contraction pulse applies the second voltage for a fourth predetermined time shorter than the third predetermined time, the second expansion pulse applies the first voltage for a fifth predetermined time shorter than the second predetermined time, and the second contraction pulse applies the second voltage for a sixth predetermined time shorter than the fifth predetermined time.

10. The liquid ejection device according to claim 9, wherein a third voltage between the first and second voltages is applied to the actuator between the first expansion and contraction pulses for the first predetermined time and between the second expansion and contraction pulses for the second predetermined time.

11. The liquid ejection device according to claim 10, wherein a value of the first voltage is negative, a value of the second voltage is positive, and a value of the third voltage is 0.

12. The liquid ejection device according to claim 9, wherein each of the first ejection waveforms causes less residual vibration of the liquid in the pressure chamber than the second ejection waveform.

13. The liquid ejection device according to claim 9, wherein the first to (n-1)-th drops of the liquid are ejected by the first ejection waveforms, and the n-th drop is ejected by the second ejection waveform.

14. The liquid ejection device according to claim 9, wherein a time difference between a center of the first expansion pulse and a center of the first contraction pulse is equal to an acoustic length of the pressure chamber that stores the liquid, multiplied by two.

15. The liquid ejection device according to claim 9, wherein the liquid ejection head is of a share mode shared wall type.

16. An inkjet printer, comprising:

a conveyer that conveys a sheet to which ink is ejected;

an inkjet head including:

a nozzle plate including a nozzle that ejects the ink, a pressure chamber that communicates with the nozzle, an actuator configured to change a volume of the pressure chamber according to a driving signal, and a drive circuit configured to issue the driving signal, wherein the driving signal includes:

one or more first ejection waveforms each including a first expansion pulse for expanding the pressure chamber and a first contraction pulse for contracting the pressure chamber at a first predetermined time after the first expansion pulse, and a second ejection waveform including a second expansion pulse for expanding the pressure chamber and a second contraction pulse for contracting the pressure chamber at a second predetermined time after the second expansion pulse, the second predetermined time being longer than the first predetermined time, and at least one or more of first to (n-1)-th drops of the ink are ejected by the first ejection waveforms, and an n-th drop of the ink is ejected by the second ejection waveform, where n is a number of drops of the ink ejected to one pixel; and a controller configured to control the conveyer to convey the sheet and the inkjet head to eject the ink to the sheet, wherein the first and second expansion pulses apply a first voltage to the actuator, the first and second contraction pulses apply a second voltage higher than the first voltage to the actuator, the first expansion pulse applies the first voltage for a third predetermined time shorter than the first predetermined time, the first contraction pulse applies the second voltage for a fourth predetermined time shorter than the third predetermined time, the second expansion pulse applies the first voltage for a fifth predetermined time shorter than the second predetermined time, and the second contraction pulse applies the second voltage for a sixth predetermined time shorter than the fifth predetermined time.

* * * * *